US009157660B2

(12) United States Patent
Taylor

(10) Patent No.: US 9,157,660 B2
(45) Date of Patent: Oct. 13, 2015

(54) SOLAR HEATING SYSTEM

(71) Applicant: George E. Taylor, Stonewall, NC (US)

(72) Inventor: George E. Taylor, Stonewall, NC (US)

( * ) Notice: Subject to any disclaimer, the term of this patent is extended or adjusted under 35 U.S.C. 154(b) by 0 days.

(21) Appl. No.: 14/211,148

(22) Filed: Mar. 14, 2014

(65) Prior Publication Data
US 2014/0261391 A1 Sep. 18, 2014

Related U.S. Application Data

(60) Provisional application No. 61/798,609, filed on Mar. 15, 2013.

(51) Int. Cl.
*F24J 2/38* (2014.01)

(52) U.S. Cl.
CPC .. F24J 2/38 (2013.01); *Y02B 10/20* (2013.01); *Y02E 10/47* (2013.01)

(58) Field of Classification Search
CPC ............... F24J 2/04; F24J 2/38; F24J 2/50; F24J 2/54; F24J 2/4609
USPC ................... 126/628–633, 701–703; 136/248
See application file for complete search history.

(56) References Cited

U.S. PATENT DOCUMENTS

| 3,985,116 | A | * | 10/1976 | Kapany | 126/687 |
|---|---|---|---|---|---|
| 4,029,258 | A | * | 6/1977 | Groth | 126/592 |
| 4,046,462 | A | * | 9/1977 | Fletcher et al. | 359/847 |
| 4,055,161 | A | * | 10/1977 | Jones | 126/580 |
| 4,066,062 | A | * | 1/1978 | Houston | 126/600 |
| 4,078,548 | A | * | 3/1978 | Kapany | 126/648 |
| 4,134,393 | A | * | 1/1979 | Stark et al. | 126/581 |
| 4,192,583 | A | * | 3/1980 | Horton | 353/3 |
| 4,250,871 | A | * | 2/1981 | Milburn, Jr. | 126/583 |
| 4,252,107 | A | * | 2/1981 | Horton | 126/605 |
| 4,283,887 | A | * | 8/1981 | Horton et al. | 52/2.17 |
| 4,317,031 | A | * | 2/1982 | Findell | 250/203.4 |
| 4,335,707 | A | * | 6/1982 | Lindenbauer | 126/576 |
| 4,365,617 | A | * | 12/1982 | Bugash et al. | 126/578 |
| 4,428,358 | A | * | 1/1984 | Adamson | 126/606 |
| 4,458,672 | A | * | 7/1984 | Wesley | 126/606 |
| 4,475,536 | A | * | 10/1984 | Dame | 126/585 |
| 4,497,311 | A | * | 2/1985 | Brandenburg, Jr. | 126/606 |
| 4,566,434 | A | * | 1/1986 | Lindenbauer | 126/577 |
| 4,691,075 | A | * | 9/1987 | Murphy | 136/246 |
| 5,941,239 | A | * | 8/1999 | Rogers | 126/698 |
| 5,979,439 | A | * | 11/1999 | Hoffschmidt et al. | 126/693 |
| 6,792,938 | B2 | * | 9/2004 | Komano et al. | 126/597 |
| 7,858,875 | B2 | * | 12/2010 | Lu | 136/246 |
| 7,952,017 | B2 | * | 5/2011 | Repetto et al. | 136/246 |
| 8,441,276 | B2 | * | 5/2013 | Tsai et al. | 324/761.01 |
| 2007/0070531 | A1 | * | 3/2007 | Lu | 359/851 |
| 2008/0289620 | A1 | * | 11/2008 | Fitz-Henley et al. | 126/576 |
| 2009/0301467 | A1 | * | 12/2009 | Cheng | 126/605 |
| 2009/0314280 | A1 | * | 12/2009 | Banerjee | 126/606 |
| 2010/0126554 | A1 | * | 5/2010 | Morgan et al. | 136/246 |

(Continued)

*Primary Examiner* — Jorge Pereiro
(74) *Attorney, Agent, or Firm* — Dowell & Dowell, PC

(57) ABSTRACT

A Fresnel lens-type solar heater including an outer enclosure having at least an upper portion for admitting solar energy to be directed to a Fresnel lens mounted above a heat sink mounted within a solar energy collector which is pivotally mounted to be movable in an east-west manner within a support cradle that is pivotally mounted to be movable in a north-south manner such that the lens is correctly oriented toward the sun during each day of a year and wherein fluid directed through the outer enclosure is heated by energy from the heat sink before being exhausted from the heater to an area to be heated.

19 Claims, 5 Drawing Sheets

(56) References Cited

U.S. PATENT DOCUMENTS

| | | | |
|---|---|---|---|
| 2011/0073160 A1* | 3/2011 | Lu | 136/246 |
| 2011/0114180 A1* | 5/2011 | Steinblatt et al. | 136/259 |
| 2011/0259396 A1* | 10/2011 | Hoffman | 136/246 |
| 2012/0133372 A1* | 5/2012 | Tsai et al. | 324/501 |
| 2012/0260906 A1* | 10/2012 | Baeten | 126/600 |
| 2012/0305077 A1* | 12/2012 | Arab et al. | 136/259 |
| 2013/0098425 A1* | 4/2013 | Amin et al. | 136/246 |
| 2013/0199515 A1* | 8/2013 | Tandler | 126/623 |
| 2014/0246075 A1* | 9/2014 | Goldsby | 136/246 |

* cited by examiner

SOLAR HEATING SYSTEM

BACKGROUND OF THE INVENTION

1. Field of the Invention

The present invention is directed to the field of solar heaters and more particularly to solar convection/conduction fluid heating systems used to augment conventional forced air heating systems or hot water radiator heating systems used to heat homes, offices and other buildings and especially to such systems that magnify solar energy to heat a material acting as a heat sink, such as a stainless steel plate, and wherein air or liquid is conveyed in heat exchange relationship with the heat sink before being conveyed into an air duct or radiator system within a structure to be heated.

2. Brief Description of the Related Art

Due to the need to find alternative sources of energy to reduce the use and consumption of energy sources such as oil, gas and electricity to provide heat for home and other building heating systems, there have been proposed systems which use solar energy to heat liquids and solids in order to provide heat which may be used to directly or indirectly heat homes and other structures. In order to increase the efficient use of solar energy, it has been proposed to use magnification devices to concentrate solar energy toward a pipe or other conduit through which a fluid medium, such as water, is being conveyed to heat the fluid before the fluid is pumped or otherwise conveyed into an area to be heated by convective heat exchange of the air with the area such as an interior room of a home. In a like manner, it has been proposed to use magnification devices to concentrate solar energy onto a solid material in order to heat the material so as to function as a heat sink to heat air or a liquid passing in heat exchange relationship with the heat sink material to heat the air or liquid by convective or conductive heat exchange.

U.S. Pat. No. 5,915,376 to McLean teaches the use of a Fresnel lens mounted within an outer dome wherein a heat sink material is heated by concentrating solar energy passing through the Fresnel lens onto the heat sink material so as to heat fluid passing in heat exchange relationship with the heat sink material. U.S. Pat. No. 4,258,698 to Sales shows a somewhat similar solar heater using a Fresnel lens to concentrate solar energy to heat a heat sink material.

U.S. Pat. Nos. 6,384,320 and 6,653,551, both to Chen, teach the use of a Fresnel lens with a solar collector wherein solar energy from the Fresnel lens is directed to a conduit through which a liquid is flowing in order to heat the liquid. U.S. Pat. No. 7,946,286 to Raymond et al teaches a roof mounted solar energy heater having a plurality of Fresnel lenses for directing solar energy toward a heat sink tube through which a fluid is flowing in order to heat the fluid.

U.S. Pat. No. 8,235,034 to Flaherty teaches a solar heater having a structure to heat both air and water for a house or other building which uses flow controllers and the like to control the circulation of the heat exchange fluid being heated by the solar energy. U.S. Pat. No. 4,026,267 to Coleman et al teaches a solar heater connected to an air duct of a conventional heating system wherein solar energy is concentrated through lenses to heat fins that are in heat exchange relationship with a flow of air or other fluid.

To further increase the efficiency of solar heaters, it has also been proposed to mount solar energy concentrators, such as Fresnel lenses, such that the lenses track the sun both as the earth rotates relative to the sun daily from east to the west and such that the lenses also remain aligned with the sun as the angle of the earth relative to the sun changes during a year, such as taught in the aforementioned patents to McLean and Raymond et al.

There remains a need to further increase the efficiency and operating characteristics of Fresnel lens type solar heaters to augment conventional home and other building forced air and liquid heating systems so as to make better use of solar energy systems and reduce the use of conventional energy sources such as oil, natural gas and electricity.

SUMMARY OF THE INVENTION

The present invention is directed to a solar power heating system which is designed to be mounted exteriorly of a home or other building but which includes an insulated heat conveying input duct or pipe which communicates with the ducts or pipes of a conventional heat source such as a furnace or boiler in order to supply heated air or liquid to supplement the supply of heated air or liquid to an area within the building to be heated using a discharge vent, for air, or radiator, for liquid. The solar heating system includes an enclosure having a transparent cover configured to allow passage of sunlight during all daylight hours for each day of a year. In the preferred embodiment, the cover is formed as a dome formed of acrylic material. The dome is sealed on top of an outer enclosure which is generally square or rectangular in cross section having side walls and a bottom wall of approximately four to six feet in width and in height. The side walls are constructed of a heat resistant material and are preferably lined on the interior with insulation.

The bottom wall of the outer enclosure includes two layers. A bottom layer is constructed of a heat resistant material and preferably lined on the interior with insulation, similar to the side walls. A top layer or false floor, typically made of steel, sits approximately an inch or more above the bottom layer. The top layer is spaced on a South wall of the enclosure such that an opening is provided between the top layer and bottom layer wide as the South wall is formed to allow air to pass between the two layers. The top layer also extends vertically along a portion of a North wall, and then extends into a heated air outlet opening, sealing the top layer to the North wall except at the opening. Air travelling along the South wall and through the opening must pass between the top layer and bottom layer and out through the air duct created by the extension of the top layer of the bottom wall and the bottom layer of the air duct.

The outer enclosure includes a removable panel in one side wall which permits access to the interior of the enclosure. Preferably, the panel includes an air inlet opening and the air outlet opening. The air inlet opening communicates with the interior of the building to be heated by an insulated duct having an inlet opening into the building such that air within the building is communicated into the outer enclosure of the solar heating assembly to be heated. The air outlet opening discharges heated air into another insulated duct which communicates with a heating duct of the building's heating system. When the solar heater of the present invention is used to supplement a water or steam heating system, as opposed to inlet and outlet air duct openings, one or more heat exchange pipes, such as copper pipes, will extend into the outer enclosure of the solar heating assembly and be connected to the heating pipes within the building.

Within the air inlet opening, a vent damper may be mounted to regulate the flow rate of air through the duct. The vent damper may be operated with a lever or a damper motor.

The vent damper may also include an outlet exhaust to bleed heated air to atmosphere in the event of overheating within the outer enclosure.

Mounted within the enclosure is a pivotal frame or cradle which is formed as an opened top substantially square box formed of a strong and rigid material having four side walls and a bottom wall. Walls on the East and West sides of the cradle are generally open to permit air flow through the heating assembly. Walls on the North and South in some embodiments may also be open to facilitate air flow. One bottom edge of the cradle is secured to a pivot bar or rod which is mounted to a pair of spaced bearings mounted to the bottom wall of the outer enclosure. A first reversible drive electric motor is drivingly connected to the pivot rod such that by operation of the motor the cradle will be pivotal about an elongated axis of the pivot rod so as to selectively adjust an angle of the open top of the cradle relative to a north-south orientation. The first motor thus permits the orientation of the open top of the cradle to be altered during the year such that the cradle remains directly oriented to the sun during seasonal changes of the earth's angle relative to the sun.

The cradle includes an upper flange surrounding the open top on which a second reversible drive sun tracking motor is mounted. The output drive shaft of the second motor extends in a direction perpendicular the longitudinal axis of the pivot rod and is axially aligned with a pivot shaft mounted in a support bearing. The support bearing is mounted on an opposite upper portion of the flange. The drive shaft of the second motor and the support bearing are fixedly secured to opposite side walls of a solar energy collector enclosure. The solar energy collector enclosure is suspended within the cradle so as to be spaced inwardly of the side and bottom walls of the cradle. The configuration of the collector enclosure in compatible with the cradle and the outer enclosure and, in the embodiment shown, includes a box-like generally square structure having four sides and a bottom wall formed as a heat sink.

A Fresnel lens is removably mounted to the top of the collector enclosure so as to direct sun light passing through the lens to be concentrated on the heat sink. The heat sink is preferably formed of a solid stainless steel. In use, sunlight passing through the Fresnel lens is concentrated on the heat sink such that the heat sink becomes heated. As air is introduced into the outer enclosure by way of operation of a blower or pump mounted adjacent to the exhaust outlet, the air passes in heat exchange relationship to the heat sink and becomes heated before being discharged to the building to be heated. In some embodiments water pipes may be placed in a location on an upper surface of the heat sink so as to be directly in the path of the concentrated sun rays from the Fresnel lens.

The second reversible drive sun tracking motor is operable to change the angle of the collector enclosure so that the Fresnel lens is directly oriented toward the sun from sunrise to sunset. After sunset, the second motor automatically re-orients the lens to begin a new tracking pattern for the next day. A sun tracking motor controller is electrically connected to the second sun tracking motor.

As a safety precaution, and to regulate temperature with the solar heating assembly, the solar collector also includes a shutter assembly mounted above the Fresnel lens. The shutter assembly includes a plurality of blinds or slats, such as aluminum or plastic slats, that are pivotally mounted within a framed and which are normally opened relative to one another extending perpendicularly to a plane of the surface of the Fresnel lens to allow maximum passage of sunlight through the Fresnel lens. However, as temperature build up within the outer enclosure, a reversibly operable shutter control electric motor, which is mounted to the collector enclosure, is operable to drive a rod to close or partially close the slats of the shutter to thereby decrease or prevent passage of sunlight to the Fresnel lens until the temperatures within the outer enclosure fall within a desire temperature range.

As a further feature of the invention, in some embodiments, a series of electrical resistance heating wires or coils may be placed in the ducting which connects the discharge duct or outlet opening from the outer enclosure to the building to be heated. On days when little sun is available to heat the heat sink material, electrical power may be supplied to the coils to provide an additional source of heat to the building being heated.

It is a primary object of the present invention to provide a solar heating assembly which may be used to supplement conventional forced air and hot water heating systems and wherein the assembly utilizes a Fresnel lens to concentrate solar energy on a heat sink mounted within an enclosure and wherein the solar collector is controlled to track the sun both daily and seasonally so as to ensure a maximum use of the sun's energy.

It is another object of the invention to provide one or more solar energy reflectors within a Fresnel lens solar heater to maximize energy reflected to a heat sink of the heater.

It is another object of the present invention to provide a solar heating assembly wherein the operating components of the assembly are safely mounted within an outer housing having a transparent cover such that the components are protected from ambient weather conditions.

BRIEF DESCRIPTION OF THE DRAWINGS

A better understanding of the invention will be had with reference to the attached drawings wherein.

DESCRIPTION OF THE PREFERRED EMBODIMENT

Figure 1:
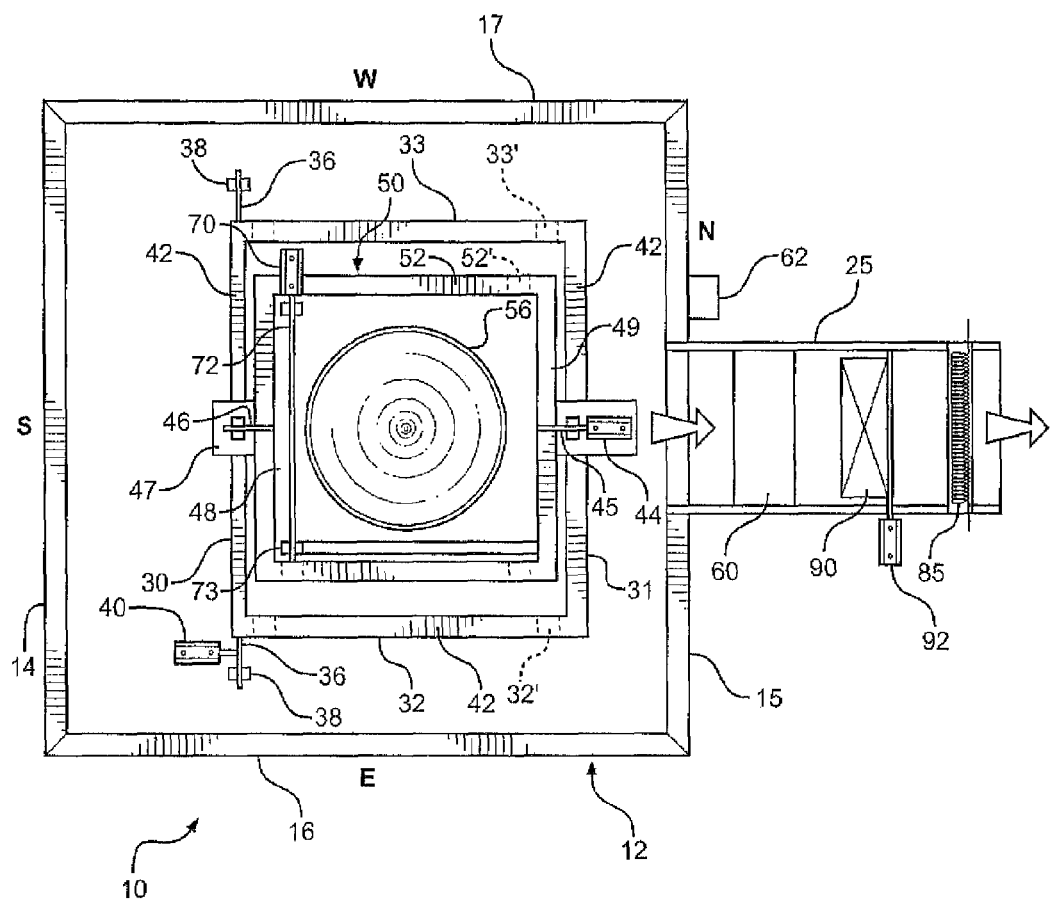
FIG. 1 is a top plan view of a first embodiment of solar heating assembly in accordance with the present invention having a transparent acrylic cover and shutter removed to show the details of a Fresnel lens concentrator as heat sink support assembly.
Figure 2:
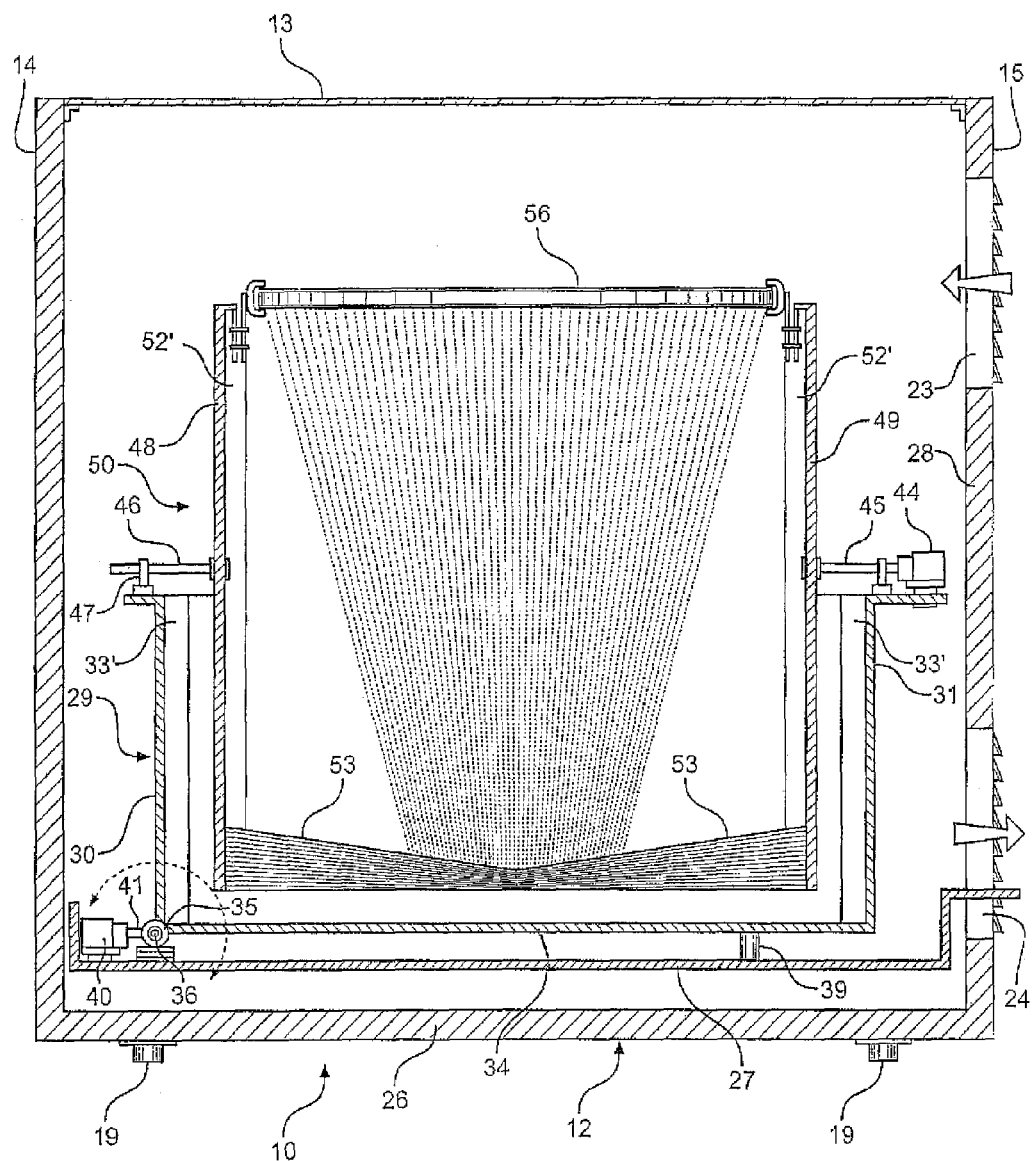
FIG. 2 is a cross sectional view taken along staggered line 2-2 of FIG. 1 showing an outer enclosure, an inner pivotal frame or cradle to which a solar collector enclosure is pivotally mounted and motors for moving the solar collector enclosure.
Figure 6:
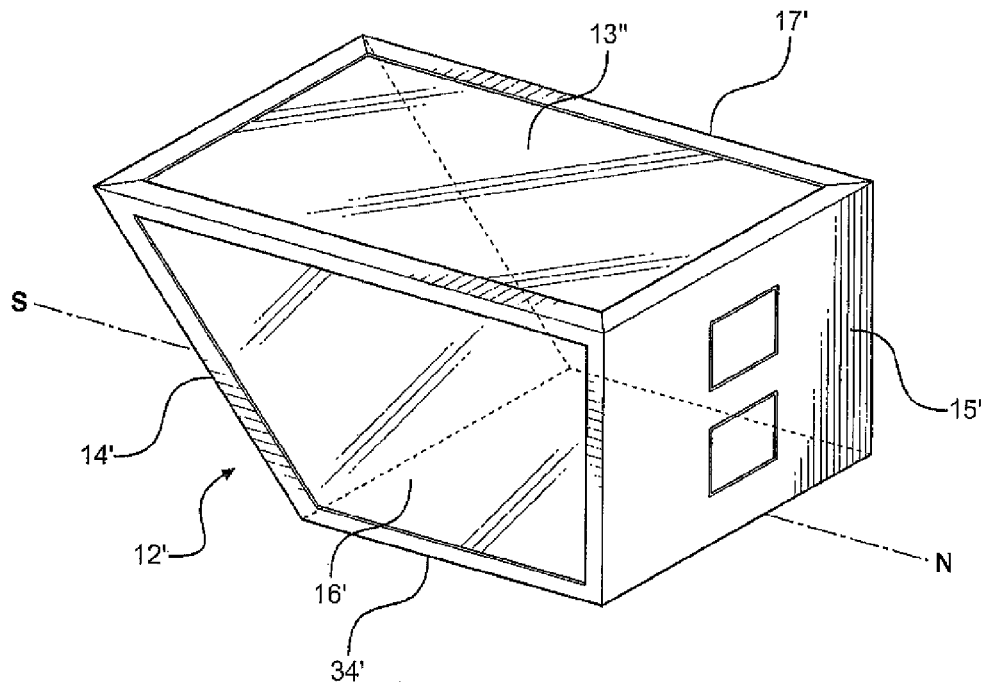
FIG. 6 is a perspective view of an alternate embodiment of outer enclosure for the solar heating assembly of the present invention.

With continued reference to the drawings, a solar energy heating assembly 10 is shown including an outer enclosure 12 which is generally square in configuration having four side walls 14, 15, 16 and 17 and a bottom wall 18. As shown in FIG. 2, support feet 19 may be mounted to the bottom wall to support the assembly on a solid pad such as a concrete pad, not shown. The top of the outer enclosure 12 includes a transparent cover which is preferably formed as an acrylic dome configuration 13 or 13', as shown in FIG. 6, or in some embodiments, may be a more planar configuration as shown in FIG. 2. In use in areas above the equator, the outer enclosure 12 is oriented as shown in FIG. 1 such that the wall 14 is oriented to the South "S", wall 15 to the North "N", wall 16 to the East "E" and wall 17 to the West "W".

Figure 5:
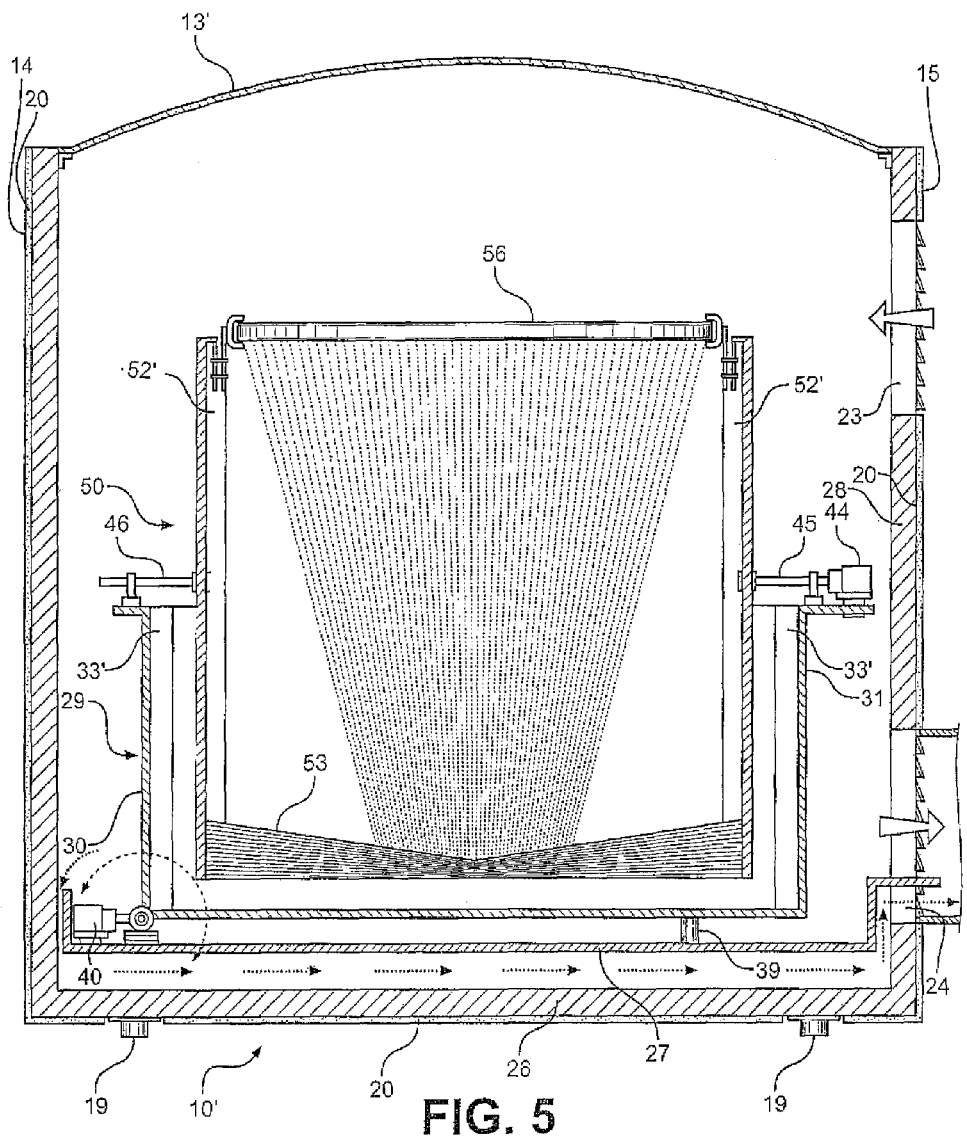
FIG. 5 is a cross sectional view similar to FIG. 2 but showing a domed acrylic lens for covering the outer enclosure of the solar heating assembly.

The outer enclosure 12 is preferably formed of metal so as to be structural sound and is provided, preferably along the outer surface of the side and bottom walls, with an insulating layer 20, only shown in FIG. 5, but applicable to all embodiments. The insulating layer 20 is sufficient to make the walls safe to the touch when the solar energy heating assembly 10 is in use. In some instances, insulation may also be applied to line the interior of the side walls 14, 15, 16 and 17 and bottom wall 18 of the outer enclosure 12.

The outer enclosure 12 is designed to be mounted exteriorly of a home or other building and be connected to ducts or pipes of a conventional heat source, such as a furnace or boiler, in order to supply heated air or liquid to supplement the supply of heated air or liquid to an area within the home or other building to be heated using discharge vents, for air, or radiators, for liquid. The outer enclosure 12 includes air inlet opening 23 which is shown as being in wall 15 in FIG. 2, however, the inlet opening may be in any of the other walls 14, 16, or 17 or through the bottom wall 18. To enhance the efficiency of the solar energy heating system 10, the air inlet opening 23 may be in communication with the interior of the home or building to be heated by way of an insulated air duct or water pipe, not shown, so as to receive air or water at room temperature into the outer enclosure 12. Extending from a discharge outlet 24 of the outer enclosure 12 is an input duct 25 that communicates with the air duct system within the house or building, not shown. The outlet opening discharges heated air into another insulated duct which communicates with a heating duct of the building's heating system. When the solar heater of the present invention is used to supplement water or steaming heating systems, as opposed to inlet and outlet air duct openings as shown in the drawings, one or more heat exchange pipes, such as copper pipes, will extend into the outer enclosure and be connected to the heating pipes within the building.

The outer enclosure 12 is generally square or rectangular in cross section having side walls 14, 15, 16 and 17 of approximately four to approximately six feet in width, length and height and a bottom wall 26. A false floor 27 sits above the bottom wall 26, leaving enough space, such as approximately one inch, for air to flow between the false floor 27 and the bottom wall 26. The false floor 26 extends from adjacent the South wall 14, leaving space for air to flow between the false floor 27 and the South wall 14. The false floor 27 also extends up and spaced from the North wall 15, and then extends into the North wall 15 adjacent to discharge outlet 24, sealing the false floor 26 to the North wall 15 except at the discharge outlet 24. The outer enclosure 12 includes a removable panel 28, see FIG. 2, in one side wall which permits access to the interior of the enclosure. Preferably, the panel includes the air inlet opening and the air outlet opening. An alternate embodiment of outer enclosure 12 is shown in FIG. 6 and will be discussed hereinafter.

Mounted within the enclosure 12 is a pivotal frame or cradle 29 which, in the embodiments of FIGS. 1-4 and 6, is formed as an opened top substantially square box constructed of a strong and rigid material having four side walls 30, 31, 32 and 33 and a bottom wall 34. The East and West walls 32 and 33 are generally open to permit air flow, however two or more reinforcing slats 32' and 33' are provided. One elongated bottom edge 35, see FIG. 2, of the cradle 29 is secured to a pivot bar or rod 36 which is mounted to a pair of spaced bearings 38 mounted to the bottom wall of the outer enclosure 12. Portion of the bottom wall 36 may be supported by stops 39 which prevent the cradle 29 from engaging the outer enclosure 12. A first reversible drive electric motor 40 is drivingly connected to the pivot rod by drive shaft 41 such that, by operation of the motor 40, the cradle 29 will be pivoted about an elongated axis A-A of the pivot rod, see FIG. 3, so as to adjust an angle of the open top of the cradle 29 relative to a north-south orientation. The first motor thus permits the orientation of the open top of the cradle 29 to be altered during the year such that the cradle 29 remains directly oriented to the sun during seasonal changes of the earth's angle relative to the sun. A variety of tracking controllers are available on the market to control the operation of the motor or the motor may be sequentially indexed a minor degree each day or other period, such as each week, so that the cradle 29 remains aligned to receive maximum sun light depending upon where the solar energy heating assembly 10 is in use.

The cradle 29 includes an upper flange 42 surrounding the open top on which a second reversible drive electrical sun tracking motor 44 is mounted. An output or drive shaft 45 of the second motor extends in a direction perpendicular the longitudinal axis of the pivot rod. The drive shaft 45 is axially aligned with a pivot shaft 46 mounted in a support bearing 47 on the flange 42. The drive shaft 45 of the second motor 44 and the support bearing 47 are fixedly secured to opposite side walls 48 and 49, respectively, of a solar energy collector enclosure 50. The collector enclosure 50 also includes East and West side walls 51 and 52 which are generally open with the exception of two or more reinforcing slats 51' and 52'. In some embodiments, the North and South side walls 49 and 48 may also be open to facilitate air flow. The collector enclosure 50 is closed at its lower end by a heat sink 53 formed of a material, such as stainless steel or wrought iron, which is to be used to retain heat created by the focusing of solar rays from the sun which pass through a Fresnel lens 56. The Fresnel lens 56 is removably mounted at the upper end of the collector enclosure 50. The Fresnel lens 56 is configured to maximize solar energy being directed to the heat sink 53.

The solar energy collector enclosure 50 is suspended within the cradle 29 so as to be spaced inwardly of the side and bottom walls of the cradle 29. The configuration of the collector enclosure 50 is compatible with the cradle 29 and the outer enclosure 12 and includes a box-like generally square structure.

The heat sink 53 is preferably formed of a solid stainless steel or wrought iron either of which may be up to six inches or more in thickness. In use, sunlight passing through the Fresnel lens 56 is concentrated on the heat sink 53 such that the heat sink becomes heated. As air is introduced through the inlet opening 23 into the outer enclosure 12 by way of operation of a blower or pump 60 mounted within the duct 25 adjacent to the exhaust outlet 24, the air passes in heat exchange relationship to the heat sink and becomes heated before being discharged through the duct 25 to the building to be heated. If the heating system is a hot water system, the inlet pipes, or coil of pipes, are placed into contact with the heat sink so that water passing through the pipe(s) will be in conductive heat exchange relationship with the heat sink 53 so as to be heated before being conveyed to heat pipes within the building being heated. In some embodiments the water pipes may be placed in a location on an upper surface of the heat sink so as to be directly in the path of the concentrated sun rays from the Fresnel lens. One or more layers of insulating material may be placed between the heat sink plate and the walls of the enclosure in order to prevent heat damage to the enclosure.

The second reversible drive sun tracking motor 44 is operable to change the angle of the collector enclosure 50 so that the Fresnel lens 56 is directly oriented toward the sun from sunrise to sunset of each day. After sunset, the second motor automatically re-orients the lens to being a new tracking sequence for the next day. A sun tracking motor controller 62 is electrically connected to the second sun tracking motor.

Figure 3:
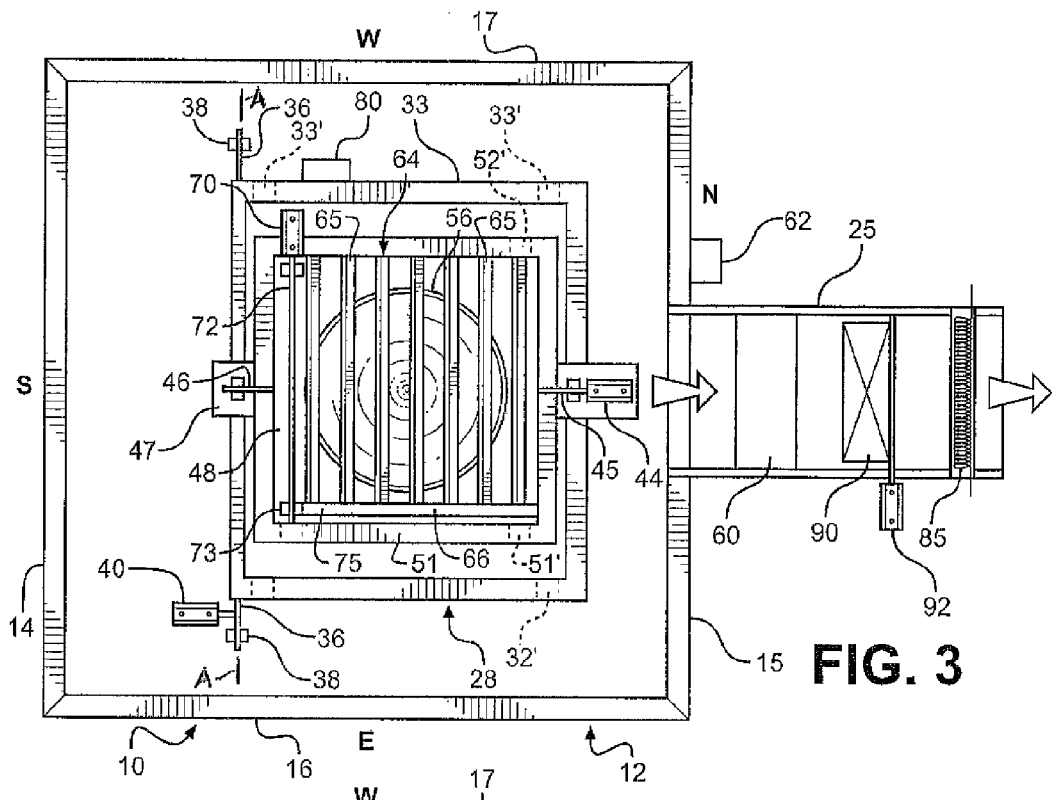
FIG. 3 is a top plan view similar to FIG. 1 showing a shutter mechanism for controlling light toward the Fresnel lens.
Figure 4:
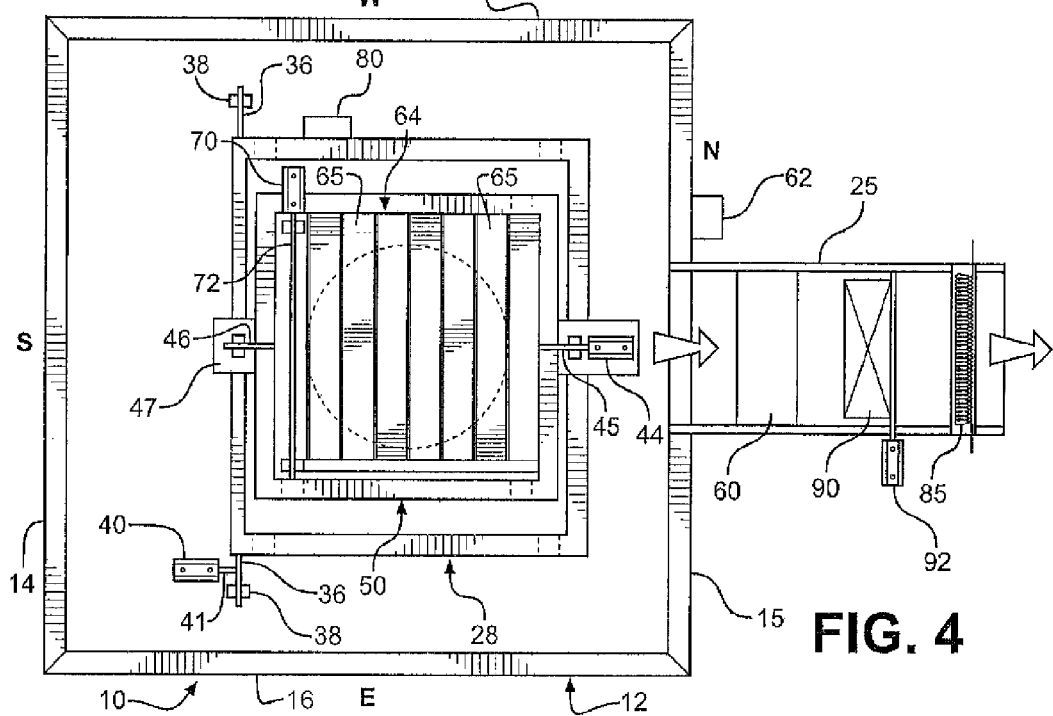
FIG. 4 is a top plan view similar to FIG. 3 showing the shutter mechanism fully closed.

As a safety precaution, and with reference to FIGS. 3 and 4, should the temperature within the outer enclosure 12 exceed a predetermined temperature above which components within the enclosure could become damaged, the solar collector also includes a shutter assembly 64 mounted above the Fresnel lens. The shutter assembly 64 includes a plurality of blinds or slats 65, such as aluminum or plastic slats, that are pivotally mounted within a frame 66 and which are normally opened relative to one another extending perpendicularly to a plane of the surface of the Fresnel lens, as shown in FIG. 3, to allow maximum passage of sunlight through the Fresnel lens. However, as temperature builds up within the outer enclosure 12, a reversibly operable shutter control electric motor 70, which is mounted to the collector enclosure, is operable to rotate a control rod 72 have a gear 73 which meshes with teeth not shown, of a reciprocating rack 75 mounted to the top of the collector enclosure and connected to the slats such that, as the rack moves linearly in a back and forth motion, it causes the slats to open or close. The slats 65 are shown in FIG. 4 in a full closed position to block solar energy from reaching the Fresnel lens. By controlling the position of the slats, the temperature within the solar heating system may be regulated. The shutter control motor 70 is connected, either wired or non-wired signal temperature monitor 80 having temperature probe, not shown, mounted into the outer enclosure 12.

In some embodiments of the invention, as opposed to placing the shutter assembly 64 within the outer enclosure 12, it may be desirable to place the shutter over the clear dome of the solar collector. In such an embodiment, the shutter motor may be placed on the outside of the outer enclosure 12 and electrically connected to a temperature sensor having a probe within the enclosure.

As a further feature of the invention, in some embodiments, a series of electrical resistance heating wires or coils 85 may be placed in the duct 25 which connects the exhaust outlet 24 to ducts in the building to be heated. On days when little sun is available to heat the heat sink material, electrical power may be supplied to the coils 85 to provide an additional source of heat to the building being heated.

A further feature of the solar energy heating assembly 10 is the provision of a vent damper 90 mounted within the duct 25. A damper control motor 92 is drivingly connected to the vent damper 90 to regulate the flow rate through the duct 25. Further, in some embodiments, the vent damper 90 may include an outlet exhaust to bleed heated air to atmosphere in the event of overheating within the outer enclosure 12.

With specific reference to FIG. 6, an alternate configuration of the outer enclosure 12' is shown. In this embodiment, in order to provide greater entry area for sun light to pass to the Fresnel lens, the upper cover 13", which is made of acrylic material, is made longer in the North-South direction. When this is done, the South side wall 14' is tapered inwardly from the top wall to the bottom wall 34'. This configuration permits a greater tilt angle to be achieved when tracking seasonal changes in the earth's angle relative to the sun as previously described. In this embodiment, the bottom wall 34' is approximately four feet wide and four feet long, North wall 15' is approximately four feet high and four feet wide, the East-West walls 16' and 17' are approximately four feet high and approximately four feet wide at their base and approximately six feet wide at their upper edge, such that the top transparent cover 13" is approximately six feet long. These measurements may change but remain generally in corresponding relative dimensions with respect to one another. Further, it is preferred that the East-West walls 16' and 17' be formed of transparent acrylic panels to facilitate maximum solar energy entrance into the enclosure. The remaining components of the solar heating system of this embodiment are not shown but remain generally the same as the previously described embodiments.

Figure 7:
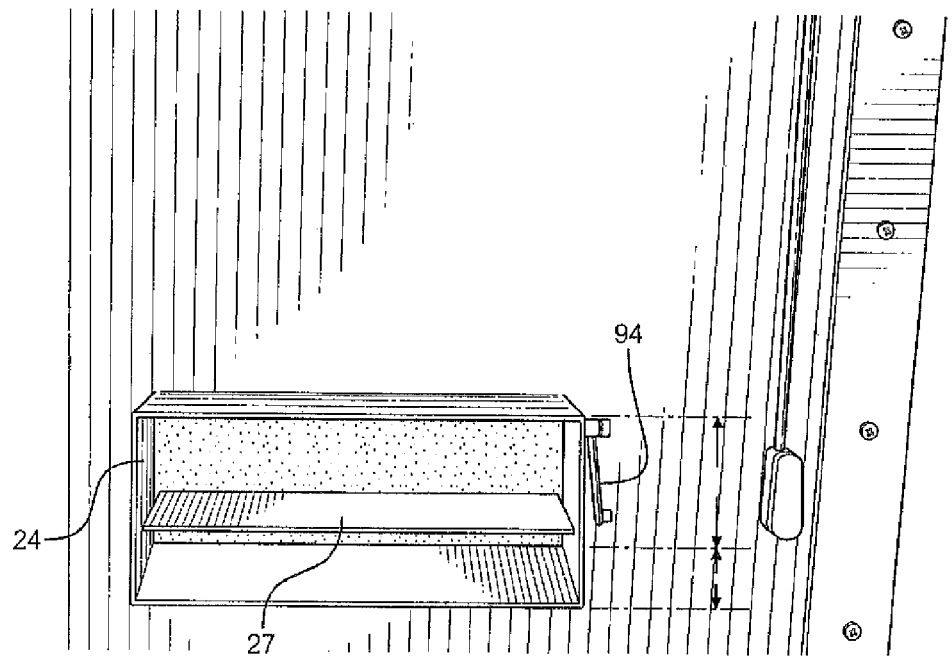
FIG. 7 is a partial view of a preferred heater in exhaust outlet with damper of the invention.

With specific reference to FIG. 7, some embodiments will have damper lever 94 attached the damper 90 to control the flow of air out of the outer enclosure 12. The damper lever may be attached to a damper motor 92 to control the position of the damper 90 within the discharge outlet 24. The damper 90 swings hingingly in the discharge outlet above where the false floor 27 enters the discharge outlet 24. By controlling the position of the damper 90 within the discharge outlet, more or less heated air may be allowed to pass into a heating duct of the building's heating system.

I claim:

1. A solar heating assembly comprising:
   an outer enclosure having side walls and a bottom wall;
   a fluid inlet opening into the enclosure and a fluid exhaust outlet from the enclosure;
   a cradle pivotally mounted within the enclosure;
   a first motor for pivoting the cradle in a north-south direction for seasonally tracking solar energy during changes in the earth's angle relative to the sun during a year;
   a solar energy collector enclosure pivotally mounted to and at least partially within the cradle so as to track an east to west relative movement of the earth relative to the sun each day;
   a second motor for moving the collector enclosure to track the sun each day;
   a Fresnel lens mounted to move within the outer enclosure above and with the collector enclosure for concentrating solar energy on a heat sink carried by the collector enclosure; and
   a blower for drawing air through the fluid inlet opening, into heat exchange relationship with the heat sink, and discharging heated fluid to the air exhaust outlet.

2. The solar heating assembly according to claim 1, including a transparent cover covering a top portion of the enclosure above the Fresnel lens.

3. The solar heating assembly according to claim 1, including a shutter assembly mounted above the collector enclosure above the lens, the shutter assembly having a plurality of slats that are pivotally adjustable relative to one another to control an amount of solar energy that can enter the collector enclosure toward the Fresnel lens.

4. The solar heating assembly according to claim 3, wherein a reversibly operable shutter control motor is drivingly connected to pivotally adjust the plurality of slats of the shutter assembly.

5. The solar heating assembly according to claim 1, including an insulating layer covering the side walls and bottom wall of the outer enclosure.

6. The solar heating assembly according to claim 1, wherein the side walls and bottom wall of the outer enclosure are made of a metal.

7. The solar heating assembly according to claim 1, wherein a plurality of electrical resistance heating wires are mounted within the fluid exhaust outlet.

8. The solar heating assembly according to claim 1, including a vent damper for regulating fluid flow out of the exhaust outlet of the outer enclosure.

9. The solar heating assembly according to claim 8, a damper control motor is drivingly connected to open and close the vent damper.

10. The solar heating assembly according to claim 1, wherein the collector enclosure includes side walls which are closed at the bottom portions thereof by the heat sink.

11. The solar collector of claim 1 wherein a top of the outer enclosure is larger than the bottom such that a side wall of the outer enclosure oriented toward the sun is inclined upwardly and outwardly from the bottom wall to the top to thereby enhance the amount of solar energy entering the outer enclosure.

12. The solar collector of claim 11 wherein side walls of the outer enclosure oriented toward the east and west are formed of transparent material.

13. A solar heating assembly comprising:
an outer enclosure having side walls and a bottom wall;
a fluid inlet opening into the enclosure and a fluid exhaust outlet from the enclosure;
a cradle pivotally mounted within the enclosure;
a first motor for pivoting the cradle in a north-south direction for seasonally tracking solar energy during changes in the earth's angle relative to the sun during a year;
a solar energy collector enclosure pivotally mounted at least partially within the cradle so as to track an east to west relative movement of the earth relative to the sun each day;
a second motor for moving the collector enclosure to track the sun each day;
a Fresnel lens mounted within the outer enclosure above the collector enclosure for concentrating solar energy on a heat sink carried by the collector enclosure; and
a blower for drawing air through the fluid inlet opening, into heat exchange relationship with the heat sink, and discharging heated fluid to the air exhaust outlet, and
wherein the cradle includes an open top and side and bottom walls, the cradle being mounted pivotal relative to a false bottom wall mounted within the outer enclosure in spaced relationship from the bottom wall of the outer enclosure such that a fluid flow channel is defined between the false floor and the bottom wall of the outer enclosure toward the exhaust outlet and another fluid flow channel is defined between the bottom wall of the cradle and the false wall toward the exhaust outlet.

14. The solar heating assembly according to claim 13, wherein the collector enclosure includes side walls which are closed at the bottom portions thereof by the heat sink.

15. The solar heating assembly according to claim 14, wherein the Fresnel lens is mounted to the collector enclosure.

16. The solar heating assembly according to claim 14, wherein one side wall of the cradle is oriented generally north, a second side wall of the cradle is oriented generally south, a third side wall of the cradle is oriented generally east and a fourth side of the cradle is oriented generally west, and the third and fourth side walls being open to permit fluid flow therethrough.

17. The solar heating assembly according to claim 14, wherein one side wall of the collector enclosure is oriented generally north, a second side wall of the collector enclosure is oriented generally south, a third side wall of the collector enclosure is oriented generally east and a fourth side of the collector enclosure is oriented generally west, and at least the third and fourth side walls are open to permit fluid flow therethrough.

18. A method of augmenting the heat of a conventional forced fluid heating system using a solar heating assembly having an outer enclosure having side walls and a bottom wall with a fluid inlet opening into the outer enclosure and a fluid exhaust outlet from the outer enclosure and wherein a cradle is pivotally mounted within the outer enclosure by a first motor for pivoting the cradle in a north-south direction for seasonally tracking solar energy during changes in the earth's angle relative to the sun during a year and wherein a solar energy collector enclosure is pivotally mounted within the cradle so as to track in an east-west direction relative to movement of the earth relative to the sun each day and wherein a second motor pivots the collector enclosure to track the sun each day and wherein a Fresnel lens is mounted within the outer enclosure above the collector enclosure for concentrating solar energy on a heat sink carried by the collector enclosure, the method comprising the steps of:
A. orienting the outer enclosure such that sunlight enters into the outer enclosure toward the Fresnel lens;
B. changing the orientation of the Fresnel lens and solar energy collector in both north-south and east-west orientations to track the angle of the sun each day such that solar energy from the sun is directed from the Fresnel lens to the heat sink;
C. introducing fluid into the outer enclosure into heat exchange relationship with the heat sink to heat the fluid; and thereafter
D. exhausting heated fluid from the outer enclosure into a heating conduit within an area to be heated and
E. controlling an amount of solar energy that is directed to the Fresnel lens within the outer enclosure by obstructing solar energy entering into the outer enclosure.

19. The method of claim 18 including as additional step of using a damper assembly to regulate fluid flow from the outer enclosure to the heating conduit.

* * * * *